US007047236B2

(12) United States Patent
Conroy et al.

(10) Patent No.: US 7,047,236 B2
(45) Date of Patent: May 16, 2006

(54) METHOD FOR AUTOMATIC DEDUCTION OF RULES FOR MATCHING CONTENT TO CATEGORIES

(75) Inventors: William F. Conroy, Champaign, IL (US); Desiree D. G. Gosby, Allston, MA (US)

(73) Assignee: International Business Machines Corporation, Armonk, NY (US)

( * ) Notice: Subject to any disclaimer, the term of this patent is extended or adjusted under 35 U.S.C. 154(b) by 486 days.

(21) Appl. No.: 10/335,351

(22) Filed: Dec. 31, 2002

(65) Prior Publication Data

US 2004/0139059 A1 Jul. 15, 2004

(51) Int. Cl.
*G06F 17/30* (2006.01)
(52) U.S. Cl. ......................................................... 707/3
(58) Field of Classification Search ................... 707/3, 707/101
See application file for complete search history.

(56) References Cited

U.S. PATENT DOCUMENTS

| | | | | |
|---|---|---|---|---|
| 5,802,508 | A | 9/1998 | Morgenstern | 706/55 |
| 6,463,430 | B1 * | 10/2002 | Brady et al. | 707/3 |
| 6,665,681 | B1 * | 12/2003 | Vogel | 707/101 |
| 6,678,694 | B1 * | 1/2004 | Zimmermann et al. | 707/102 |
| 6,711,585 | B1 * | 3/2004 | Copperman et al. | 707/104.1 |
| 6,763,349 | B1 * | 7/2004 | Sacco | 707/3 |
| 6,847,972 | B1 * | 1/2005 | Vernau et al. | 707/101 |
| 2002/0016800 | A1 | 2/2002 | Spivak et al. | 707/523 |

OTHER PUBLICATIONS

Data Mining Techniques: for Marketing, Sales, and Customer Support, Michael J. A. berry, Gordon Linoff, http://dssresources.com/books/contents/berry97.html.*
Automatic Segmentation, Classification and Clustering of Broadcast News Audio, Matthew A. Siegler, Uday Jain, Bhiksha Raj, Richard M. Stern; ECE Department—Speech Group, Carnegie Mellon University, Pittsburgh, PA 15213.*

* cited by examiner

*Primary Examiner*—Safet Metjahic
*Assistant Examiner*—Thanh-Ha Dang
(74) *Attorney, Agent, or Firm*—Schmeiser, Olsen & Watts; Stephen Keohane

(57) ABSTRACT

Accordingly, the invention is a method for automatic deduction of rules for matching document content to a category within a strange taxonomy, which allows the document to be automatically classified into a proper category for storage in that strange taxonomy. The method includes the steps of spidering the taxonomy to determine its structure and contents, extracting keywords from documents within the strange taxonomy, formulating rules for determining the category from the extracted keywords, and applying the rules to classify a new document whose keywords have been extracted. The taxonomy is strange because the user has no knowledge of its internal structure and needs no such knowledge. The taxonomy may be flat or may be hierarchal, the later having rules formulated at each level for proceeding to the next level. Variations for creating new and refurbishing old document management systems are disclosed.

20 Claims, 5 Drawing Sheets

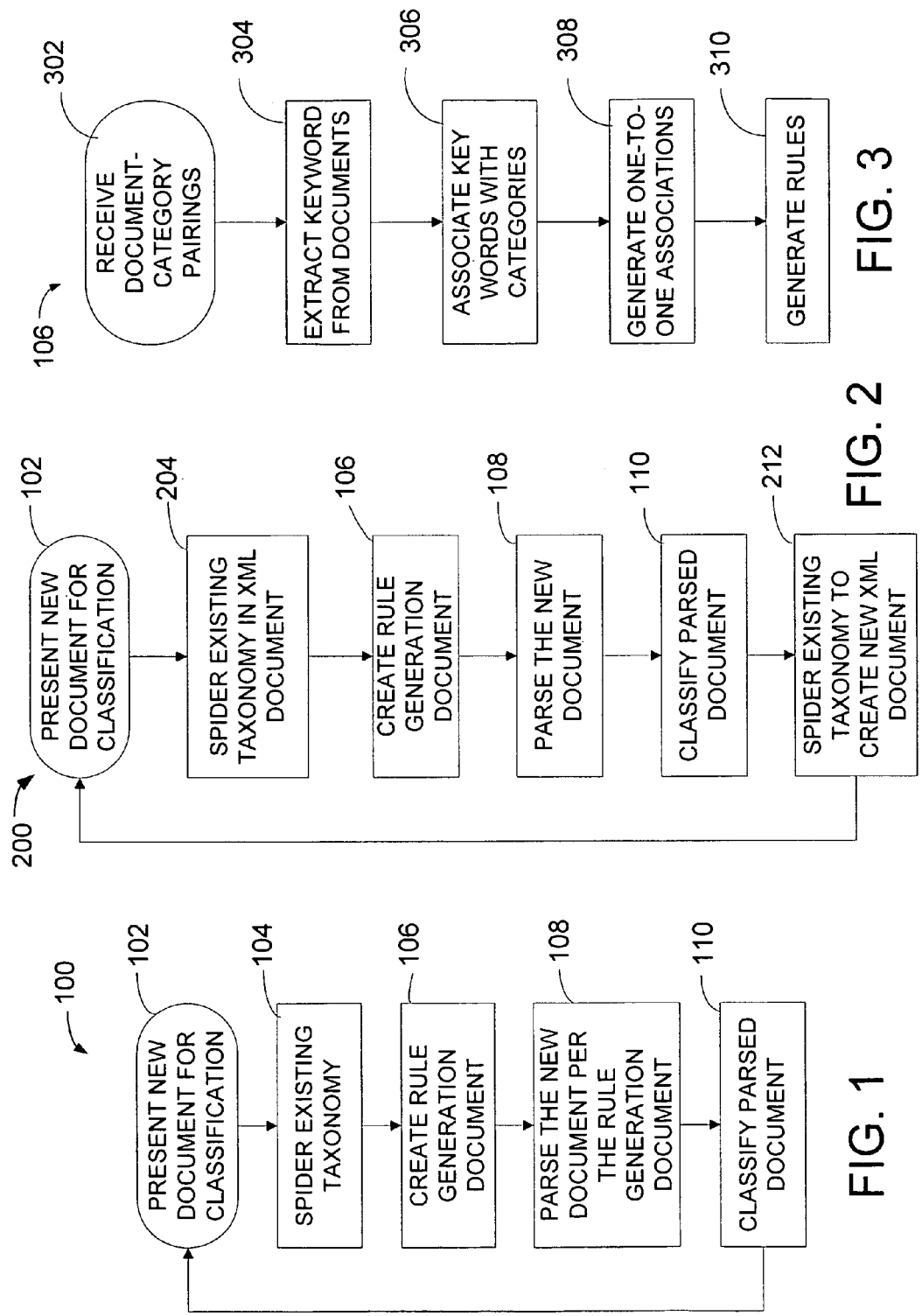

METHOD FOR AUTOMATIC DEDUCTION OF RULES FOR MATCHING CONTENT TO CATEGORIES

BACKGROUND OF THE INVENTION

1. Technical Field

This invention relates generally to computerized document management systems. It relates more specifically to methods for finding the correct place to store a new document in a strange taxonomy.

2. Background

Computer storage of soft documents is ubiquitous in modern technological life. Documents are filed in the computer according to a filing scheme, or taxonomy, which may organize documents by a variety of criteria. A taxonomy may be for a complex relational database with millions of records or for a web site with hundreds of pages. New documents are frequently created which must be added to the existing taxonomy. For a user of the computer to file the document, the user conventionally must have knowledge of the taxonomy in which the new document is to be stored. The user then selects a category, or node, within the taxonomy based on the user's knowledge of that taxonomy and stores the document in the selected category.

Access to strange taxonomies carries with it a costly learning curve for each user, because computer storage taxonomies can be incredibly complex. Furthermore, both those who would store and those who would retrieve documents from a taxonomy must have knowledge of it. As documents are added to an existing taxonomy, new categories may be formed, requiring frequent updating of the user's knowledge.

Human users vary in their perceptions and so each individual may categorize documents differently. As a consequence, one user's classification may be confusing to the next user's searching method, making document retrieval inefficient or impossible.

Accordingly, what is needed is a way to store documents that does not require the users who store and retrieve documents to know the taxonomy in which the document is stored. What is also needed is a uniform and predictable storage method that makes searching for documents in strange taxonomies more reliable and, possibly, faster.

SUMMARY OF THE INVENTION

One aspect of the invention is a method of classifying document content within a taxonomy, the taxonomy comprising a plurality of categories in a computer document storage organizational scheme and a plurality of first documents tagged according to the taxonomy, each first document within the plurality of first documents classified within one category of the plurality of categories according to the taxonomy, the method comprising the steps of a) spidering both the taxonomy and the plurality of first documents tagged according to the taxonomy to generate pairings of each first document within the plurality of first documents with one category within the plurality of categories within the taxonomy; b) creating a rule generation document representing each of the pairings of each first document within the plurality of first documents with one category within the taxonomy; c) parsing a second document according to the rule generation document; and d) classifying the parsed second document into one category within the plurality of categories within the taxonomy.

Another aspect of the invention is a method for categorizing the content of a new document within a strange taxonomy, the strange taxonomy comprising a plurality of categories and a plurality of documents within at least one of the categories within the plurality of categories, wherein a root node for the taxonomy has been provided, the method comprising the steps of a) automatically spidering the taxonomy to identify each category among the plurality of categories and each document among the plurality of documents classified within each respective category; b) automatically forming pairs for each of the documents, the pair comprising one of the documents and the category within which the one of the documents is classified; c) automatically extracting keywords from each of the documents in each of the categories; d) automatically associating the extracted keywords from each of the documents within each of the categories with the category in which the documents are classified; e) automatically generating rules, each rule mapping at least one of keywords and patterns of keywords to the category in which the documents containing the at least one of keywords and patterns of keywords are classified; f) automatically parsing an unclassified document to determine new keywords therein; and g) automatically classifying the unclassified document into at least one of a new category and a category having documents containing at least one of keywords and patterns of keywords similar to the new keywords.

A third aspect of the invention is an apparatus comprising: a) at least one processor; b) a memory coupled to the at least one processor; b) computer-readable data storage media coupled to the at least one processor; c) a plurality of documents tagged according to a taxonomy, the documents residing in the computer readable data storage media, the documents comprising content, the content comprising keywords; and d) a rule-deducing content classification mechanism residing in memory.

A fourth aspect of the invention is a program product comprising: a) a rule-deducing classification mechanism residing in memory, the rule-deducing classification mechanism operable to spider the taxonomy and the tagged documents classified therein, to deduce rules for classifying documents within the taxonomy, and to classify a new document according to the taxonomy; and b) computer-readable signal bearing media bearing the rule-deducing classification mechanism.

A fifth aspect of the invention is a method of storing a new document according to a strange taxonomy, the method comprising a step of providing the new document and a starting point in the strange taxonomy to a rule-deducing document classification and storage computer program, the program automatically spidering the strange taxonomy and tagged documents classified therein, automatically deducing rules for classification of the new document, automatically classifying the new document according to the rules deduced, and automatically storing the new document according to the classification of the new document.

A sixth aspect of the invention is a method of classifying document content within at least one taxonomy, the at least one taxonomy comprising a plurality of categories in a computer document storage taxonomy and at least one first document tagged according to the taxonomy, the at least one first document classified within at least one category within the plurality of categories of the at least one taxonomy, the method comprising the steps of a) at least one of spidering and crawling both the at least one taxonomy and the at least one first document tagged according to the taxonomy to generate at least one pairing of at least one first document with the at least one category in which the at least one first document is classified within the at least one taxonomy; b) creating a rule generation document representing the at least one pairing of at least one first document with the at least one category within the at least one taxonomy; c) parsing a second document according to the rule generation document; and d) classifying the parsed second document into at least one category in the at least one taxonomy.

A seventh aspect of the invention is a method of finding documents in a computerized document management system, wherein the lost documents are lost to search engines because of incorrect filing, the method comprising the steps of a) retrieving each document; and b) saving each document under a new taxonomical root using a rule-deducing classification mechanism.

BRIEF DESCRIPTION OF THE DRAWINGS

The foregoing and other features and advantages of the method for automatic deduction of rules for matching content will be apparent from the following more particular description of specific embodiments of the method for automatic deduction of rules for matching content, as illustrated in the accompanying drawings, wherein:

FIG. 1 depicts a first exemplary embodiment of the method for automatic deduction of rules for matching content;

FIG. 2 depicts a second exemplary embodiment of the method for automatic deduction of rules for matching content;

FIG. 3 depicts an exemplary embodiment of a step of the method for automatic deduction of rules for matching content depicted in FIG. 1;

DETAILED DESCRIPTION OF EMBODIMENTS OF THE INVENTION

Figure 5:
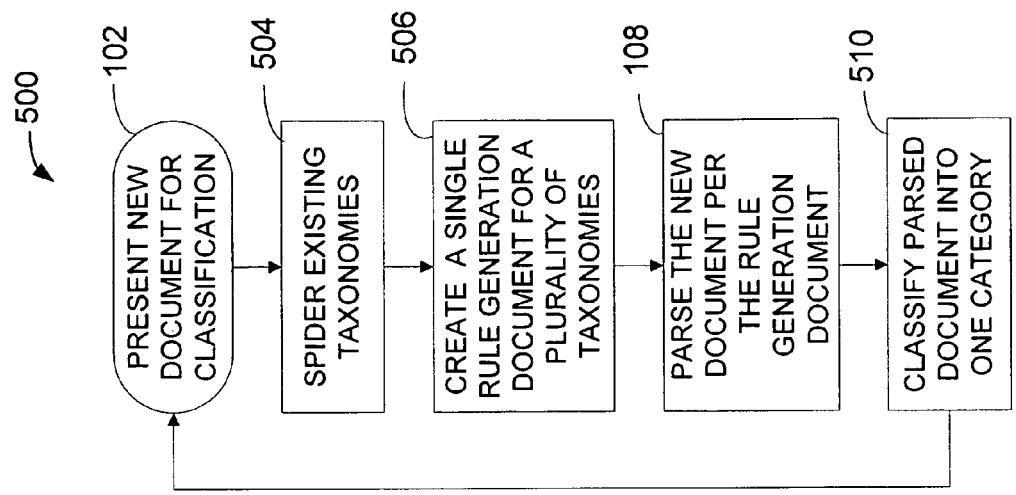
FIG. 5 depicts a third exemplary embodiment of the method for automatic deduction of rules for matching content.

Referring now to the figures, FIG. 1 shows a diagram of a process 100 for an exemplary method for automatic deduction of rules for matching content. The process 100 begins when a new document is presented in step 102 to be stored in an existing document management system or other data management system having data content tagged according to a taxonomy. The existing document management system normally comprises at least one tagged document classified in at least one category. "Document" is used broadly herein to describe a discrete data structure having tagged content, or data. "Metadata" conventionally refers generally to information about the data, or information about the document content. "Metadata" also refers more specifically to information about the data, or information about the document content, that is contained or isolated separately from the content. Herein, the specific usage of "metadata" will be assumed unless otherwise described.

"Tags" refer to information about the content that is contained within and distributed throughout the content, and so represent a subclass of metadata in the general sense of the term. Tags are normally invisible to the document user but may be searched for or parsed. For example, a text document may have each keyword followed by or preceded by a tag that identifies a keyword, making it convenient to search for keywords in a document. Rather than search for each keyword in a long sequence of keywords, a search can be done for keyword tags, thereby finding all keywords in a single search pass. Tags rely on conventions for their effectiveness. Conventions for tagging documents is the target of significant standardization efforts, but tagging conventions still proliferate. Tags may comprise links. A particular tagging convention may be part of a taxonomy for a document management system.

A "taxonomy" is a systematic scheme for organizing discrete but related individual items, such as plant species or documents. For example, a taxonomy for documents may comprise a hierarchy of related categories, wherein each lower level of the hierarchy comprises subsets of the categories of the next higher level. A document is tagged according to a taxonomy when some tags contain information associated with a category in the taxonomy. For example, the tag could identify a keyword and give a category in which a document with such a keyword belongs. Such a system would usually result in oversimplification: in most document management systems, the taxonomy is quite complex and reference to more than one keyword is required for proper classification. For example, in even a simple hierarchal taxonomy, at least one keyword would be needed to make a choice at each level of the hierarchy. Hierarchies can be dozens or even hundreds of layers deep. In another example, the tagging convention could provide for a dedicated category tag or tags which could be quickly searched.

A "strange" taxonomy is a novel taxonomy wherein the user has no view of the internal organizational scheme. Thus, a strange taxonomy is a black box into which a user stores documents and from which a user retrieves documents. Any taxonomy may be made strange by the use of the present invention. An advantage of a strange taxonomy is that documents are filed according to predictable computer algorithms, and open taxonomies are filed according to human perception. Predictable filing enables predictable searching.

"Keyword," as defined and used herein, refers to individual keywords and to key phrases. "At least one keyword" may be an individual keyword, a keyword phrase, or a pattern of keywords. Patterns of keywords are collections of keywords associated with a particular document or a particular category.

Step 102 presents a new document for classification to a document management system having documents tagged according to the taxonomy of the document management system. In response to the presentation step 102, step 104 automatically spiders the existing taxonomy to determine its categories and to identify documents within each category. A document may be identified within a category by storage location, metadata, or tagging. Spidering, and a functional variant thereof, crawling, are known in the art. The spider is a program that searches along a sequence of links between documents to map a taxonomy. Different types of taxonomies, such as web sites and databases, require spiders specifically adapted to the particular type of taxonomy. Spiders can provide a wide variety of information. The spider of step 104 returns pairings of each document with its category or categories. Conventionally, each document is classified in only one category, but not in all cases. In a hierarchal taxonomy, a document may be classified in all of the categories between its immediate category and the topmost, or root, category. If the spider finds no documents in step 104, the keywords of the new document may be identified by grammatical, lexicographical, syntactical, or similar analysis, tagged, and a new category may be created for the new document.

Next, step 106 creates a rule generation document, which be discussed in more detail infra under FIG. 3. The document-category pairs found by the spider are used as a basis for making classification rules. Each document in a category is analyzed by an analysis technique appropriate to the application to extract keywords and key phrases. Mappings from keywords to categories are thereby formed, and the rule generation document records the rules that represent or are derived from these mappings.

Figure 4:
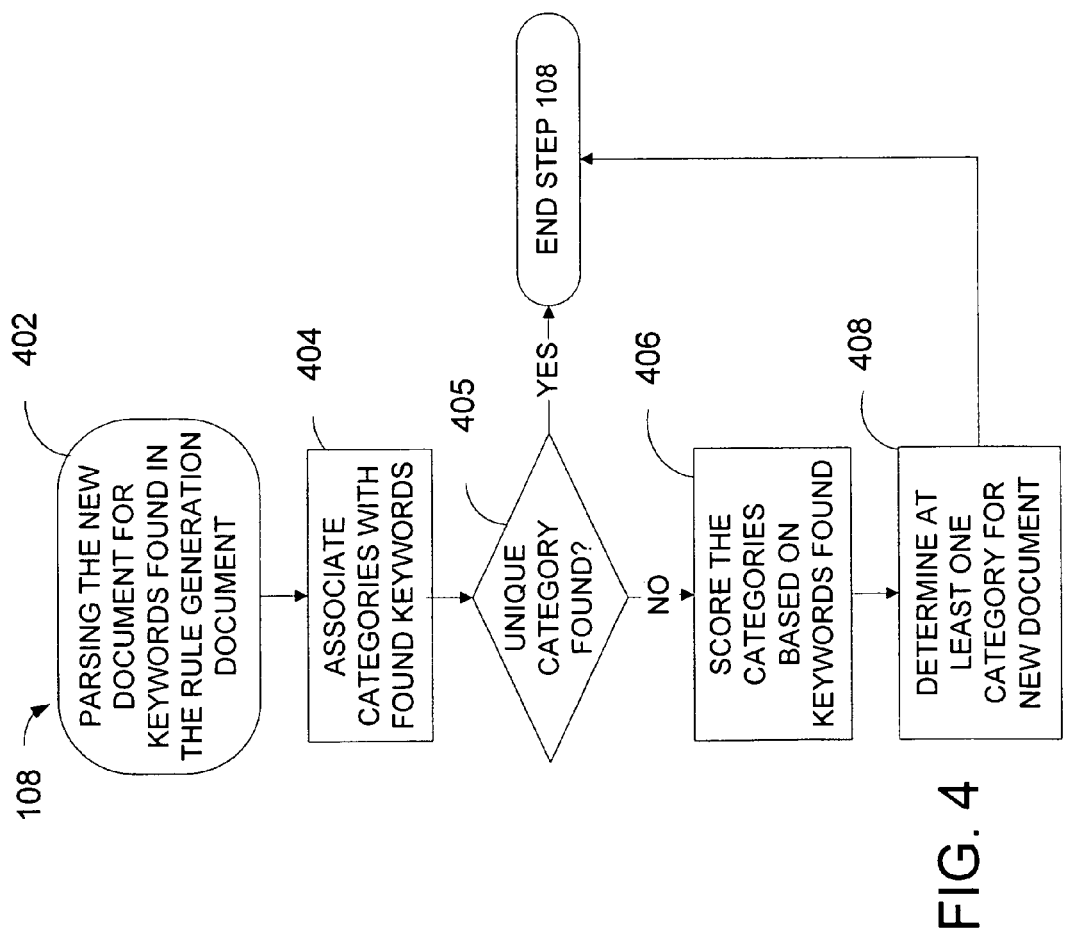
FIG. 4 depicts an exemplary embodiment of another step of the method for automatic deduction of rules for matching content depicted in FIG. 1.

The next step 108 in process 100 (FIG. 1) is to parse the new document according to the rule generation document 402 (FIG. 4). It may be wasteful to search the new document for every possible combination of keywords when only particular keywords or particular combinations of keywords will uniquely identify a category. The new document may not be tagged according to the taxonomy. Accordingly, the new document is first parsed in step 108 to find only those keywords that contribute to uniquely identifying a category: the keywords in the rule generation document. If such a pattern of keywords is found, then a category may be uniquely identified and step 108 is complete. If relevant keywords are found, but several categories are still possible, more steps are required. In alternate embodiments, the new document may be searched for all keywords initially or after a failure to find keywords from the rule generation document in the new document. All of the keywords may be used in forming a new category.

In step 110, the parsed new document may be automatically classified according to the strange taxonomy. Classification may include automatically tagging the document according to the taxonomy. Automatic tagging may involve inserting keyword tags associated with the new document's keywords which were used for classification within the taxonomy. In some embodiments, it may further include one or more category tags. In some embodiments, classification may further involve tagging additional keywords found by grammatical, lexicographical, syntactical, or similar analysis of the document. In some embodiments, automatic classification step 110 may be accomplished by a pre-existing classification engine. In some embodiments, classification may include storing the document in storage location associated with the category. In other embodiments, classification may be accomplished by additions to the metadata of the document. At the end of step 110, the process starts again at step 102 with the presentation of the next new document.

FIG. 2 depicts a second exemplary embodiment 200 of the method for automatic deduction of rules for matching content which employs a dual spider approach. In step 212, a first spider, specifically adapted for a document management application, spiders the taxonomy and records the taxonomy, including the categories and the documents in those categories, in a map document. The map document may be an XML document. XML provides a common format for the output of various specifically-adapted spiders. A new map document may be made in step 212, perhaps by editing the existing map document, after each new document is added. Each new classified document has the potential to change a decision about the classification of the next new document. In a document management system having only one source of new documents, automatically editing the map file with data on the new document is acceptable. In a multiuser system, updates should be made after each new document is added. For small multiuser systems, a single map document may be used and edited. For large multiuser systems, multiple map documents may be used. An advantage of the dual-spider approach is that the map document may be used by software searching for a stored document. At the completion of step 212, the process 200 loops back to receive the next new document in step 102. Step 102 may be the same as step 102 in process 100.

In step 204, a second spider, adapted to spidering the map document created in step 212, spiders the map document in response to being presented with a new document to classify from step 102. Spidering the map document in step 204 may be extremely fast, allowing classification decisions to be made rapidly. In an embodiment, the map document may be spidered to support a search for a classified document. Steps 106, 108, and 110 may be the same as in process 100.

FIG. 3 shows exemplary steps within step 106, wherein a rule generation document is created based on document-category pairings returned 302 by the spider. The rule generation document holds rules which map keywords or patterns of keywords to categories. The next step 304 extracts keywords from the documents returned by the spider. The spider may include links to the documents in the document-category pairings received in step 302. The extraction of keywords may comprise reading keywords from metadata, reading tags and their associated content, and/or parsing the document for keywords based upon grammatical, lexicographical, syntactical, or similar rules. Step 306 associates the extracted keywords with the categories of the document-category pairings.

Step 308 simplifies these potentially complex results into a series of one-to-one associations. For example, if a keyword is associated with ten categories, ten one-to-one associations may be formed. From these one-to-one associations, patterns of keywords may be discerned and mapped to categories. The identification of patterns of keywords uniquely identifying categories may comprise part of rule generation 310. Identification of unique keywords that uniquely identify categories may comprise another part of rule generation 310. The rule may be simply: "Keywords A, B, and not C means category 21," expressed in a markup or similar language or structure. Any rule that maps from one or more keywords to a category is contemplated by this invention. For example, a rule may incorporate more than the mere existence of a keyword by weighting a keyword in a document title more than a keyword in a document abstract which, in turn, is weighted more than a keyword in the document body which, in another turn, is weighted more than a keyword in a footnote.

The rule generation table represents the document-category pairings as document-keyword-patterns-to-unique-category pairings.

FIG. 4 shows exemplary steps for the case when a unique category identification cannot be made from the keywords occurring in the new document and the rule generation document. Steps 402 and 403 are the basic steps of parsing the new document 402 and associating categories with the keywords found in the new document 404. Step 405 inquires if step 404 results in a unique classification and, if so, ends step 108. If not, the categories associated with even one keyword are scored according to a predetermined scoring criteria in step 408. The predetermined criteria may comprise similarity to at least one pattern or part of a pattern of keywords associated with a category, frequency of keywords in a category, commonality of keywords among documents in a category, absence of particular keywords among documents in a category, uniqueness of documents in a category, and the like.

Figure 7:
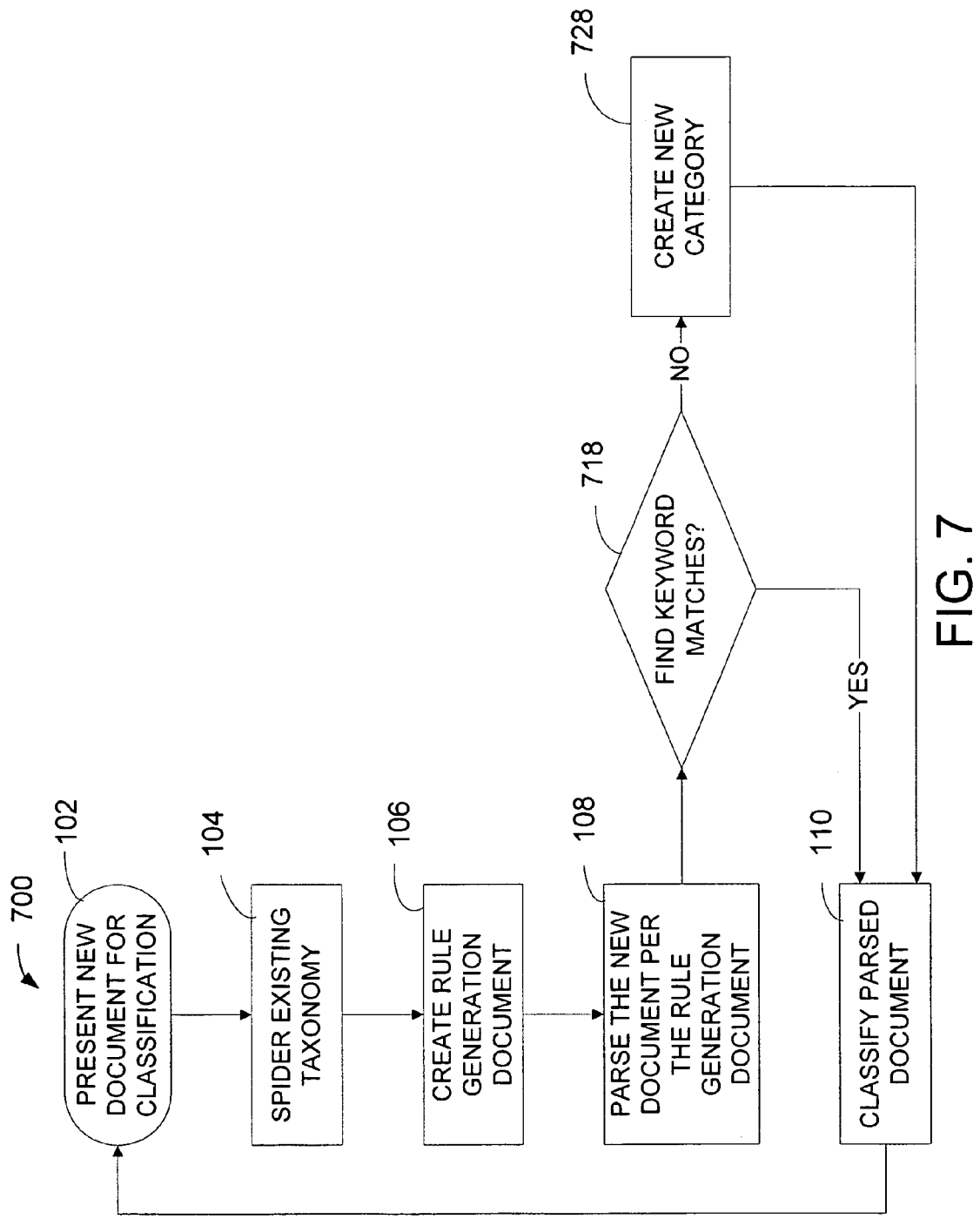
FIG. 7 depicts a fifth exemplary embodiment of the method for automatic deduction of rules for matching content.

If a category with a unique maxima score (or unique minima score, depending on the scoring scheme) emerges, that category may be determined in step 408. If a category is the only category above (or, depending on the scoring scheme, below) a threshold score, that category may be determined in step 408. If the scoring in step 406 leaves more than one category as a possibility, the document may be classified in each remaining category or none in step 408. Alternatively, the first-in-time acceptable score may be chosen. If it is determined that no categories score well enough to form a basis for classification or if multiple categories are indicated but multiple classifications are ruled out, or if no keywords are matched (step 718, FIG. 7) then a new category may be formed in step 728 (FIG. 7). The category may be based on keywords found in the new document which do not match those in the rule generation document.

FIG. 5 depicts a third exemplary embodiment 500 of the method for automatic deduction of rules for matching content. Embodiment 500 comprises a method for automatically deducing rules for classifying documents within a plurality of taxonomies that are not necessarily arranged in a hierarchy. Step 504 initiates in response to the presentation of a new document for classification in step 102 and spiders all the taxonomies available. Step 102 may be the same as step 102 in process 100. In step 506, a single rule generation document is created which includes rules for the categories in all of the available taxonomies. Step 108, parsing the new document, may be the same as step 108 in embodiment 100. When the rules are applied in step 510 to classify the new document, the process 500 may inherently choose the best taxonomy for the document, wherein the best taxonomy may be the one with the best-fitting category. Using embodiment 500, a user presenting an unread document can learn a great deal about its content. In an alternate embodiment, the step 510 may return a notice to the user as to which taxonomy was selected, either for user approval or open loop. At the end of step 510, the process loops back to step 102 to receive the next new document.

Figure 6:
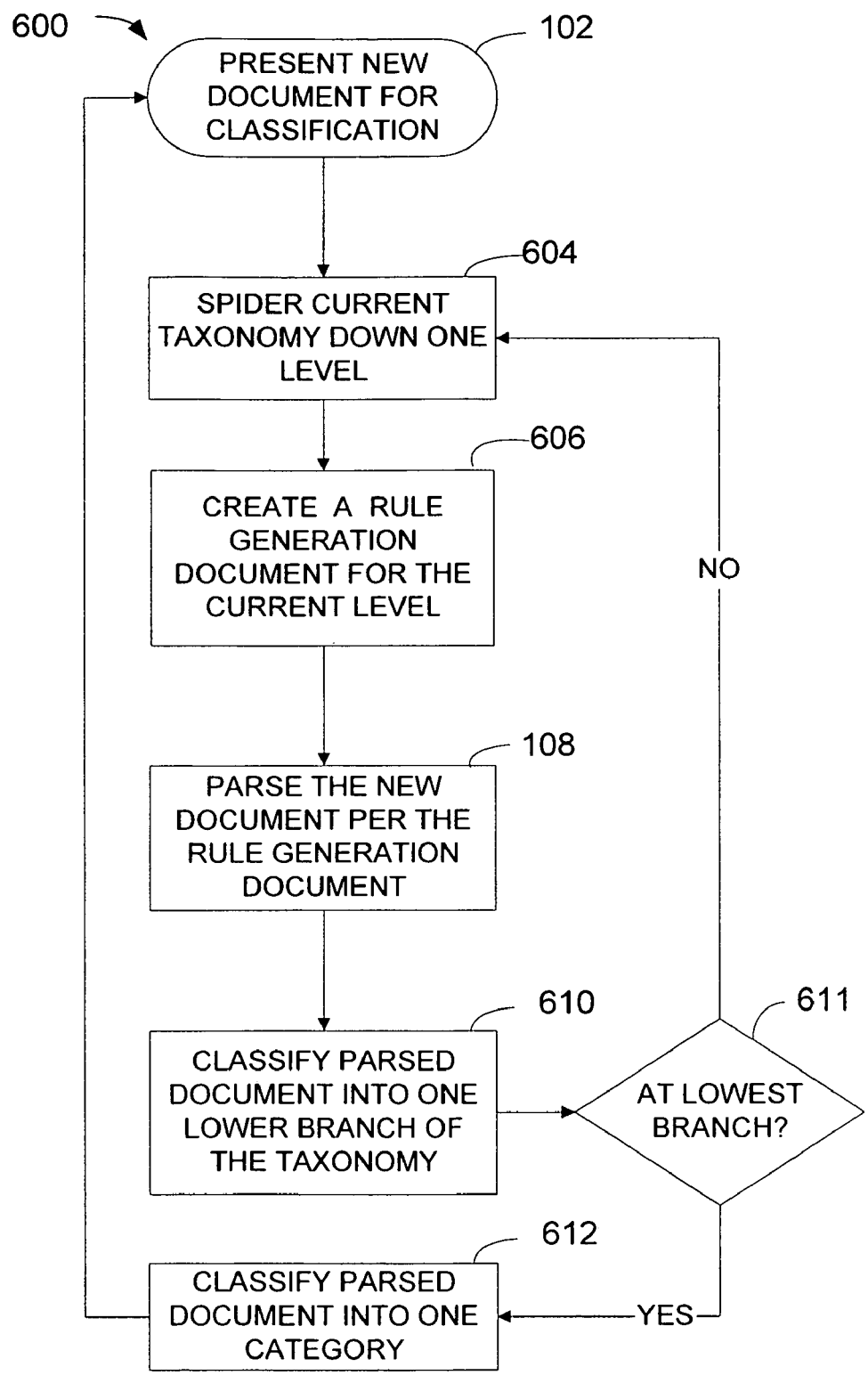
FIG. 6 depicts a fourth exemplary embodiment of the method for automatic deduction of rules for matching content.

FIG. 6 depicts a fourth exemplary embodiment 600 of the method for automatic deduction of rules for matching content. Embodiment 600 comprises a method for automatically deducing rules for classifying documents within a plurality of taxonomies that are arranged in a hierarchy. The approach is a level-by-level approach. Responsive to the presentation of a new document for classification in step 102, step 604 spiders down one level in the hierarchy. Initially, this is from the root to the first level. Any level may have both additional taxonomies and categories containing documents. Based on document-taxonomy and document-category pairings acquired by the spider, a rule generation document is created in step 606 for selecting either a category or a taxonomy which may be on the lower, spidered level. Step 108 in embodiment 600 may be the same as step 108 in embodiment 100. In step 610, the new document, parsed in step 108, is classified into either a taxonomy or into a category. Step 611 enquires as to whether the classification effort has reached the lowest level needed. If a suitable category has been found, the answer is YES, and the new document is classified into the suitable category in step 612. If the level is not the lowest level, and no suitable category has been found, the answer is NO, and the next level is spidered in step 604. On any level that has been reached, where no suitable category or taxonomy has been found, the failed-search steps of embodiment 100, discussed under FIG. 4, above, or the failed search steps 718–728 of embodiment 700, discussed below under FIG. 7 below, may be incorporated. After classification of the new document in step 612, the process 600 loops back to step 102 to receive the next new document.

FIG. 7 depicts a fifth exemplary embodiment 700 of the method for automatic deduction of rules for matching content. Steps 102, 104, 106, and 108 may be the same as the like-numbered steps in embodiment 100. Embodiment 700 comprises steps 718 and 728 for responding to a failed search for keywords in the new document, which new keywords match keywords in the rule generation document. Step 718 tests for failure, and, if no keyword matches are found, directs the generation of a new category in step 728. Other failure criteria may be added or substituted for the one illustrated in step 718. For example, failure to achieve an acceptable score in step 406 (FIG. 4) of embodiment 100 (FIG. 1). If the reason for the search failure is that there are not yet any documents classified within the taxonomy, creating a new category is still the correct response to the failure. The keywords in the very first document classified into the taxonomy must be found by grammatical, lexicographical, syntactical, or similar textual or data analysis or must be pre-tagged. Thus, a new taxonomy can begin from a blank root node.

Figure 8:
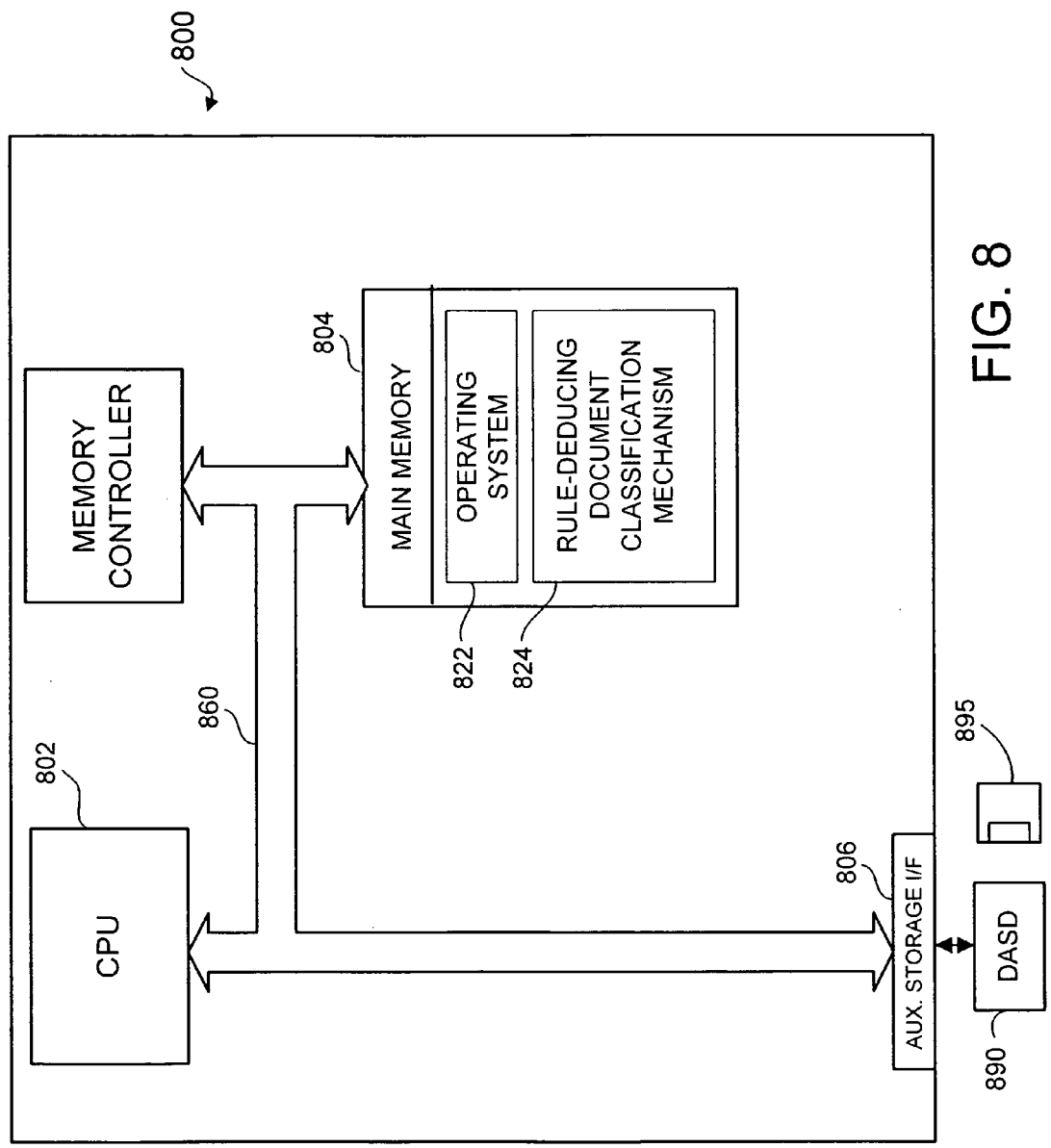
FIG. 8 depicts an exemplary embodiment of an apparatus implementing the method for automatic deduction of rules for matching content.

FIG. 8 depicts an apparatus 800 for implementing an embodiment of the method for automatic deduction of rules for matching content. Apparatus 800 comprises a central processing unit, or processor, 802 coupled to a memory 804 by bus 860. Also coupled to the processor 802 by bus 860 and storage interface 806 is a computer-readable data storage device, or Direct Access Data Storage Device (DASD) 890. Conventionally, the documents classified within the taxonomy are physically located on the DASD 890. In some embodiments, the classified documents may be physically located on a removable data storage medium such as disk 895. In other embodiments, the document and taxonomy information may be available from computer-readable signal-bearing media through an interface to bus 860.

Program 824, resident in memory, may have been loaded into memory from DASD or from computer-readable signal-bearing media through an interface to the bus 860. Program 824, the rule-deducing document classification mechanism, is a software instantiation of the method for automatic deduction of rules for matching content. Program 824 responds to the presentation of a new document in step 102 (FIG. 1) by classifying it within a strange taxonomy known to the user only by a root node or alias for the root node. Presentation of the new document may be by execution of a conventional or dedicated "save" command. The program 824 may be part of a larger program operative to create and save documents. Alternatively, the rule-deducing document classification mechanism 824 may incorporate automatic saving after document classification is complete.

Using apparatus 800, a document author, database administrator, document management system administrator, or other user merely identifies a taxonomy or a group of taxonomies and saves the document. All details of location and classification within the taxonomy may be hidden from the user. New users do not have to learn the taxonomy in order to classify or retrieve documents. The classification is uniform and therefore tractable to search engines. Documents do not become unretrievable by search engines because of mis-classification.

A legacy document management system, comprising many mis-classified documents, may be reformed or refurbished by retrieving each document and then saving each legacy document (through program 824), in turn, under a new root node. In an embodiment, retrieval of the documents may be based upon storage location rather than conventional search criteria, in order to obtain the documents that conventional search engines miss. One or more faux documents may be seeded under the root node to provide an initial structure, if desired. If grammatical, lexicographical, syntactical, or similar analysis of documents is used to identify keywords, even untagged legacy documents will become properly tagged and classified according to the taxonomy. Documents lost by mis-filing in a document management system may thus be found.

The foregoing description has described selected embodiments of a method for automatic deduction of rules for matching content.

While the invention has been particularly shown and described with reference to selected embodiments thereof, it will be readily understood by one of ordinary skill in the art that, as limited only by the appended claims, various changes in form and details may be made therein without departing from the spirit and scope of the invention. For example, many of the special features of each exemplary embodiment may be incorporated in other embodiments.

We claim:

1. A method of classifying document content within a strange taxonomy, the strange taxonomy comprising a plurality of first categories in a computer document storage organizational scheme and a plurality of first documents, each first document tagged with at least one first category according to the strange taxonomy, the method comprising the steps of:
   spidering the strange taxonomy to generate at least one pairing of each first document with each first category with which the each first document is tagged, said strange taxonomy having an internal organizational structure that cannot be viewed by a user who is interacting with the strange taxonomy;
   creating a rule generation document representing each of the at least one pairings;
   parsing a second document according to the rule generation document; and
   classifying the parsed second document into a particular first category, said classifying comprising submitting the parsed second document to a classification engine.

2. The method of claim 1, wherein the step of spidering the plurality of first documents comprises spidering to retrieve at least one of metadata, a storage location, and a category tag.

3. The method of claim 1, wherein the step of spidering the plurality of first documents tagged with at least one first category according to the strange taxonomy comprises the steps of:
   spidering the strange taxonomy with a first spider, the first spider adapted to the strange taxonomy being spidered;
   creating a third document using the first spider, the third document describing the strange taxonomy, the third document comprising a link to each of the first documents; and
   spidering the strange taxonomy with a second spider by spidering the third document created by the first spider, the second spider operable to access each of the first documents through the links in the third document.

4. The method of claim 3, wherein the step of creating the third document comprises creating an XML document.

5. A method of classifying document content within a taxonomy, the taxonomy comprising a plurality of first categories in a computer document storage organizational scheme and a plurality of first documents, each first document tagged with at least one first category according to the taxonomy, the method comprising the steps of:
   spidering the taxonomy to generate at least one pairing of each first document with each first category with which the each first document is tagged; creating a rule generation document representing each of the at least one pairings;
   parsing a second document according to the rule generation document; and
   classifying the parsed second document into a particular first category, said classifying comprising submitting the parsed second document to a classification engine,
   wherein the taxonomy comprises a strange taxonomy and wherein the step of spidering the plurality of first documents tagged with at least one first category according to the taxonomy comprises the steps of:
   spidering the strange taxonomy with a first spider, the first spider adapted to the strange taxonomy being spidered;
   creating a third document using the first spider, the third document describing the strange taxonomy, the third document comprising a link to each of the first documents; and
   spidering the strange taxonomy with a second spider by spidering the third document created by the first spider, the second spider operable to access each of the first documents through the links in the third document,
   wherein the steps of spidering the strange taxonomy with the first spider and creating a third document comprise steps taken after the second document is classified into the taxonomy, the second document thereby becoming a first document within the plurality of first documents.

6. A method of classifying document content within a taxonomy, the taxonomy comprising a plurality of first categories in a computer document storage organizational scheme and a plurality of first documents, each first document tagged with at least one first category according to the taxonomy, the method comprising the steps of:
   spidering the taxonomy to generate at least one pairing of each first document with each first category with which the each first document is tagged;
   creating a rule generation document representing each of the at least one pairings;
   parsing a second document according to the rule generation document; and
   classifying the parsed second document into a particular first category, said classifying comprising submitting the parsed second document to a classification engine,
   wherein the taxonomy comprises a strange taxonomy and wherein the step of spidering the plurality of first documents tagged with at least one first category according to the taxonomy comprises the steps of:
   spidering the strange taxonomy with a first spider, the first spider adapted to the strange taxonomy being spidered;
   creating a third document using the first spider, the third document describing the strange taxonomy, the third document comprising a link to each of the first documents; and
   spidering the strange taxonomy with a second spider by spidering the third document created by the first spider, the second spider operable to access each of the first documents through the links in the third document, wherein the step of spidering the strange taxonomy with a second spider comprises the step of spidering the strange taxonomy with a second spider after the second document is presented for classification within the taxonomy.

7. The method of claim 3, further comprising making the third document available for use by document-searching software.

8. The method of claim 1, wherein the step of creating a rule generation document comprises the steps of:
  receiving a plurality of first-document-category pairings produced by the spidering step;
  extracting at least one of a keyword and a pattern of keywords from each of the first documents within the plurality of first documents;
  associating each at least one of a keyword and a pattern of keywords in each of the first documents with the at least one first category of the first document from which the at least one of a keyword and a pattern of keywords was extracted; and
  generating rules for mapping at least one of a keyword and a pattern of keywords to the first category.

9. The method of claim 8, wherein the step of associating each at least one of a keyword and a pattern of keywords in each of the first documents with the at least one first category of the first document from which the at least one of a keyword and a pattern of keywords was extracted further comprises parsing each first document.

10. The method of claim 8, wherein the step of associating each at least one of a keyword and a pattern of keywords in each of the first documents with the at least one first category of the first document from which the at least one of a keyword and a pattern of keywords was extracted further comprises reading keywords from the metadata of each first document.

11. The method of claim 1, wherein the rule generation document comprises rules for mapping from at least one of a keyword and a pattern of keywords to one or more first categories, the step of parsing a second document according to the rule generation document comprises the steps of:
  parsing the second document to determine at least one of a keyword and a pattern of keywords; looking up the at least one of a keyword and a pattern of keywords of the second document in the rule generation document to find at least one of the first categories associated with the at least one of a keyword and a pattern of keywords of the second document;
  scoring the found at least one first category according to a predetermined criteria; and
  determining from the scoring the at least one first category comprising the classification of the second document.

12. The method of claim 11, wherein the step of scoring according to a predetermined criteria comprises scoring by at least one of:
  similarity to at least one pattern of keywords associated with a first category;
  frequency of keywords in a first category;
  commonality of keywords among documents in a first category;
  absence of particular keywords among documents in a first category; and
  uniqueness of keywords in a first category.

13. The method of claim 12, wherein the step of determining from the scoring at least one first category further comprises the steps of selecting one of:

a) the at least one first category having a score comprising an extrema among the alternatives;
b) at least one first category having a score in a predetermined relationship to a predetermined threshold score; and
c) at least one first category having a particular predetermined score.

14. The method of claim 13, wherein the step of selecting further comprises selecting the at least one first category having the first-in-time score meeting the selection criteria.

15. The method of claim 1, wherein the step of classifying the parsed second document into at least one first category comprises at least one of the steps of adding data to the metadata of the second document identifying the at least one first category, tagging the second document according to the taxonomy, and storing the second document in a location associated with the at least one first category.

16. The method of claim 1, wherein the step of classifying the parsed second document into a first category further comprises tagging the parsed second document.

17. A method of classifying document content within a taxonomy, the taxonomy comprising a plurality of first categories in a computer document storage organizational scheme and a plurality of first documents, each first document tagged with at least one first category according to the taxonomy, the method comprising the steps of:
  spidering the taxonomy to generate at least one pairing of each first document with each first category with which the each first document is tagged;
  creating a rule generation document representing each of the at least one pairings;
  parsing a second document according to the rule generation document; and
  classifying the parsed second document into a particular first category, said classifying the parsed second document into the particular first category comprising submitting the parsed second document to a classification engine,
  wherein the taxonomy comprises a plurality of strange taxonomies, and further wherein:
  the step of creating a rule generation document comprises generating a single rule generation document for the plurality of strange taxonomies; and
  the step of classifying the parsed second document into at least one first category comprises the steps of:
  classifying the parsed second document into one strange taxonomy within the plurality of strange taxonomies; and
  classifying the parsed second document into one category within the plurality of categories within the strange taxonomy;
  the method operable to select one strange taxonomy among the plurality of strange taxonomies within which to classify the second document.

18. A method of classifying document content within a taxonomy, the taxonomy comprising a plurality of first categories in a computer document storage organizational scheme and a plurality of first documents, each first document tagged with at least one first category according to the taxonomy, the method comprising the steps of:
  spidering the taxonomy to generate at least one pairing of each first document with each first category with which the each first document is tagged;
  creating a rule generation document representing each of the at least one pairings;
  parsing a second document according to the rule generation document; and classifying the parsed second document into a particular first category, said classifying the parsed second document into the particular first category comprising submitting the parsed second document to a classification engine, wherein the taxonomy comprises a hierarchy of strange taxonomies, and further wherein:

the step of creating a rule generation document comprises at least one of:

generating at least one rule within the rule generation document for each strange taxonomy within the hierarchy of strange taxonomies; and creating a rule generation document for each level of the hierarchy of strange taxonomies; and the step of classifying the parsed second document into at least one first category comprises the steps of:

classifying the parsed second document into at least one strange taxonomy within the hierarchy of strange taxonomies; and classifying the parsed second document into at least one first category within the at least one strange taxonomy within the hierarchy of strange taxonomies.

19. A method of classifying document content within a taxonomy, the taxonomy comprising a plurality of first categories in a computer document storage organizational scheme and a plurality of first documents, each first document tagged with at least one first category according to the taxonomy, the method comprising the steps of:

spidering the taxonomy to generate at least one pairing of each first document with each first category with which the each first document is tagged;

creating a rule generation document representing each of the at least one pairings;

parsing a second document according to the rule generation document; and classifying the parsed second document into a particular first category, said classifying the parsed second document into the particular first category comprising submitting the parsed second document to a classification engine, wherein the rule generation document comprises rules for mapping from at least one of a keyword and a pattern of keywords to one or more first categories, and wherein the step of parsing the second document according to the rule generation document comprises the steps of:

finding no keywords in the parsed second document similar to keywords in the rule generation document;

creating a new category within the taxonomy; and classifying the second document in the new category.

20. A method for categorizing the content of a new document within a strange taxonomy, the strange taxonomy comprising a plurality of first categories and a plurality of first documents within at least one of the first categories, wherein a root node for the strange taxonomy has been provided, the plurality of first documents being stored on a computer-readable strorage device, the method being implemented through execution of computer readable program code by a processor of a computer system, said computer readable program code being stored on a computer usable medium, the method comprising the steps of:

automatically spidering the strange taxonomy to identify each first category and each document among the plurality of first documents classified within each respective first category;

automatically forming pairs for each of the first documents, each pair comprising one of the first documents and the category within which the one of the first documents is classified;

automatically extracting at least one of a keyword and a pattern of keywords from each of the first documents in each of the first categories;

automatically associating at least one of a keyword and a pattern of keywords extracted from each of the first documents within each of the first categories with the first category in which the first documents are classified;

automatically generating rules, each rule mapping at least one of a keyword and patterns of keywords to the first category in which the first documents containing the at least one of a keywords and a pattern of keywords are classified;

automatically parsing an unclassified document to determine new keywords therein; and automatically classifying the unclassified document into at least one of a new category and a first category having documents containing at least one of keywords and patterns of keywords similar to the new keywords.

* * * * *

UNITED STATES PATENT AND TRADEMARK OFFICE
CERTIFICATE OF CORRECTION

| | |
|---|---|
| PATENT NO. | : 7,047,236 B2 |
| APPLICATION NO. | : 10/335351 |
| DATED | : May 16, 2006 |
| INVENTOR(S) | : Conroy et al. |

It is certified that error appears in the above-identified patent and that said Letters Patent is hereby corrected as shown below:

On the Title Page
In the Abstract, Line 14, delete "the later having" and insert -- the latter having --

Column 10
Lines 13 - 15, form a new paragraph with "creating a rule generation document representing each of the at least one pairings;"

Column 14
Line 11, delete "strorage" and insert -- storage --
Line 36, delete "of a keywords" and insert -- of a keyword --

Signed and Sealed this

Twenty-second Day of August, 2006

JON W. DUDAS
*Director of the United States Patent and Trademark Office*